(12) United States Patent  (10) Patent No.: US 7,753,379 B2
Galpin  (45) Date of Patent: Jul. 13, 2010

(54) GASKET WITH TRANSITION SEALING FEATURE

(75) Inventor: Andrew A. Galpin, Nashua, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 476 days.

(21) Appl. No.: 11/676,696

(22) Filed: Feb. 20, 2007

(65) Prior Publication Data

US 2008/0197581 A1  Aug. 21, 2008

(51) Int. Cl.
*F02F 11/00* (2006.01)

(52) U.S. Cl. .................... 277/598; 277/637

(58) Field of Classification Search ............. 277/598, 277/630, 637
See application file for complete search history.

(56) References Cited

U.S. PATENT DOCUMENTS

| | | | | |
|---|---|---|---|---|
| 3,095,619 | A | * | 7/1963 | Peterson .................. 277/316 |
| 3,694,894 | A | * | 10/1972 | Jelinek et al. ............. 29/451 |
| 3,936,059 | A | | 2/1976 | Gordon |
| 4,535,996 | A | | 8/1985 | Cardis et al. |
| 4,597,583 | A | * | 7/1986 | Inciong et al. ............ 277/591 |
| 4,759,556 | A | | 7/1988 | Udagawa et al. |
| 4,997,193 | A | * | 3/1991 | Czernik .................... 277/591 |
| 5,145,190 | A | | 9/1992 | Boardman |
| 5,536,023 | A | * | 7/1996 | Surbrook et al. .......... 277/593 |
| 5,662,337 | A | * | 9/1997 | Surbrook et al. .......... 277/594 |
| 5,934,686 | A | * | 8/1999 | Ottenschlager .......... 277/591 |
| 5,957,100 | A | | 9/1999 | Frohwerk et al. |
| 6,003,878 | A | | 12/1999 | Noble et al. |
| 6,945,538 | B2 | | 9/2005 | Novil et al. |
| 7,128,322 | B2 | | 10/2006 | Novil et al. |
| 2004/0135323 | A1 | * | 7/2004 | Salameh ................... 277/628 |
| 2005/0127615 | A1 | * | 6/2005 | Matsuki et al. ........... 277/592 |
| 2006/0001221 | A1 | | 1/2006 | Herrera et al. |

* cited by examiner

*Primary Examiner*—Thomas B Will
*Assistant Examiner*—Gilbert Y Lee
(74) *Attorney, Agent, or Firm*—Ronald W. Wangerow; Harness, Dickey & Pierce, P.L.C.

(57) ABSTRACT

A gasket can include a body adapted to form a seal in an engagement region between two members. A first sealing portion can be formed in the body and define a first plane. A second sealing portion can be formed in the body and occupy a space outside of the first plane. A first transition portion is formed between the first and second portions. The first transition portion defines a first width in the engagement region that is greater than a second width defined in the first and second portion adjacent to the first transition portion.

20 Claims, 4 Drawing Sheets

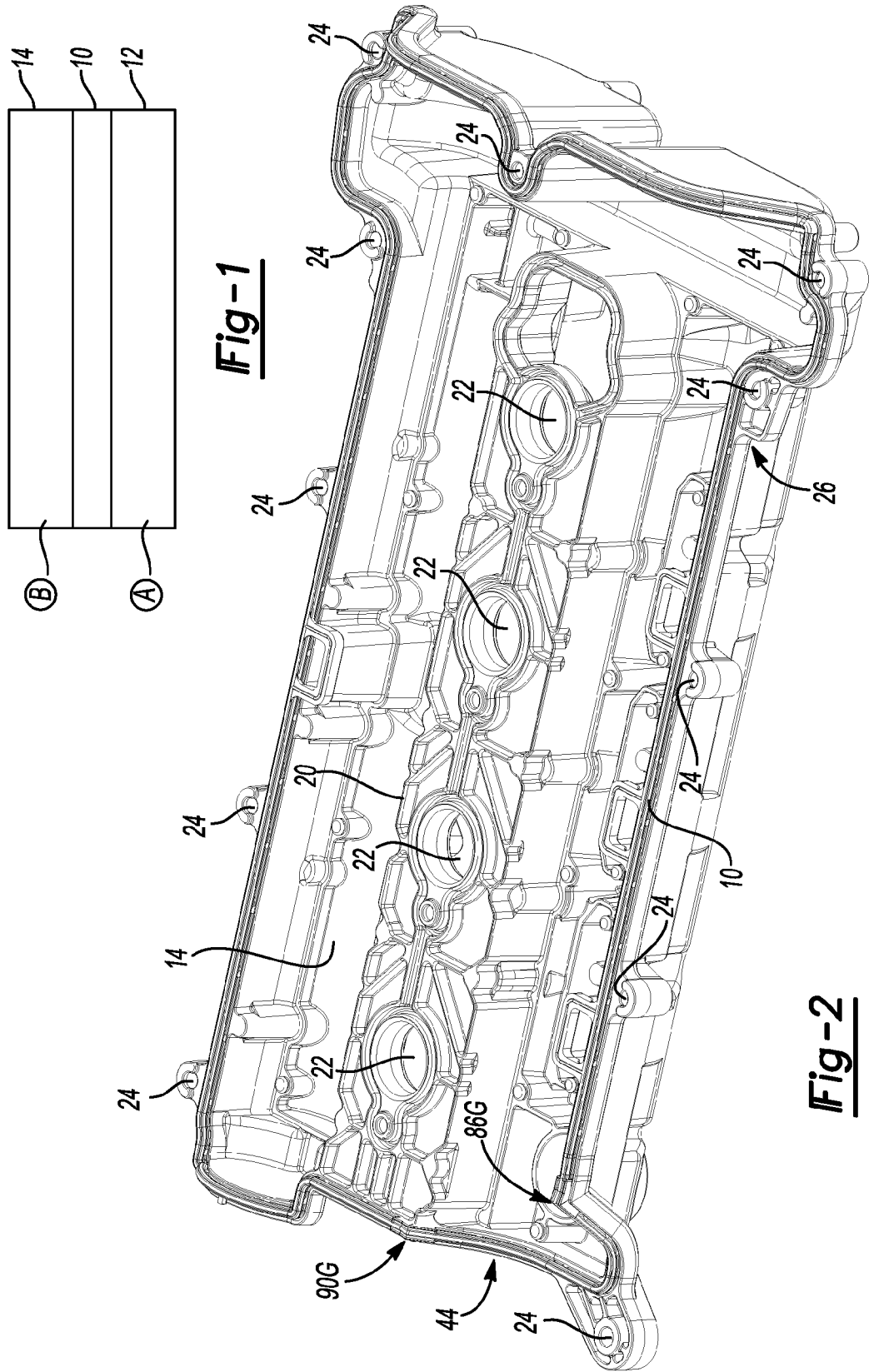

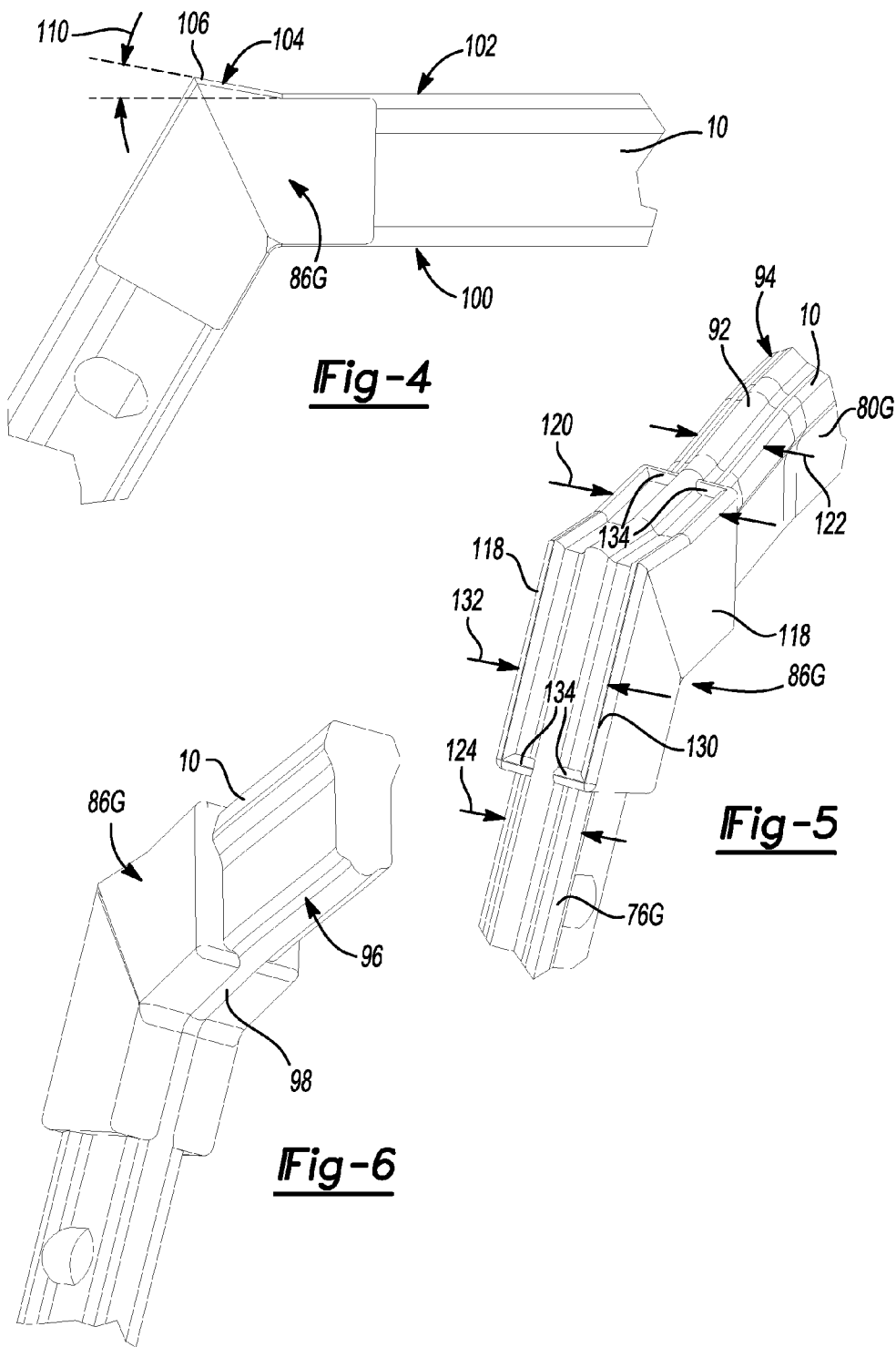

GASKET WITH TRANSITION SEALING FEATURE

FIELD

The present disclosure relates generally to gaskets used to provide a seal between two parts, and more specifically to a valve cover gasket having differing cross-sections at various locations in an engagement region.

BACKGROUND

Gaskets can be used to provide a leak proof seal between two engine parts or other components. A gasket can be placed between the opposite surfaces of the two components and compressed between them to prevent the escape of a gas, fluid or other medium. One exemplary gasket application is a valve cover gasket. Valve cover gaskets can be formed at least partially of elastomeric material and generally can be installed between a cam cover and a cylinder head of an engine. In some instances, a cam cover and cylinder head can define a substantially planar mating or sealing surface. In other instances however, a cam cover and cylinder head may define non-planar mating surfaces. In these examples, such as where a sharp transition exists in the engagement region, the gasket structure must also accommodate for such transitions. As can be appreciated, sealing mating surfaces with these transitions can be challenging.

In one example, a supplemental flowable sealant, such as a silicone sealant or caulking medium such as RTV (room temperature vulcanizing) sealant, may be applied on the gasket face to enhance sealing characteristics. It would be desirable to provide a gasket that provides favorable sealing characteristics at sharp transitions in the engagement region without requiring supplemental flowable sealants.

SUMMARY

A gasket can include a body adapted to form a seal in an engagement region. A first sealing portion can be formed in the body and define a first plane. A second sealing portion can be formed in the body and occupy a space outside of the first plane. A first transition portion is formed between the first and second portions. The first transition portion defines a first width in the engagement region that is greater than a second width defined in the first and second sealing portions adjacent to the first transition portion.

According to additional features, the transition portion can define at least one sealing bead formed in the engagement region. The sealing bead can include a continuous sealing bead formed in the first sealing portion, the second sealing portion and the transition portion. An additional pair of sealing beads can be formed on the transition portion that define an offset that is greater than the second width. The first plane of the first sealing portion can be further defined by an upper sealing plane and a lower sealing plane. The first transition portion can define a ramped surface extending at an angle from the lower sealing plane in a direction away from the upper sealing plane.

In other features, a second transition portion can be formed between the first and second portions. The second transition portion can define a third width in the engagement region that is greater than the second width.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a schematic view of an exemplary gasket shown interposed between a first member such as an cylinder head and a second member such as a cam cover;

FIG. 2 is a perspective view of a valve cover gasket constructed in accordance to the present teachings and shown seated onto an exemplary cam cover;

FIG. 4 is a side view of a transition portion of the valve cover gasket of FIG. 3;

FIG. 5 is a lower perspective view of the transition portion of FIG. 4;

FIG. 6 is an upper perspective view of the transition portion of FIG. 4; and

DETAILED DESCRIPTION

Figure 3:
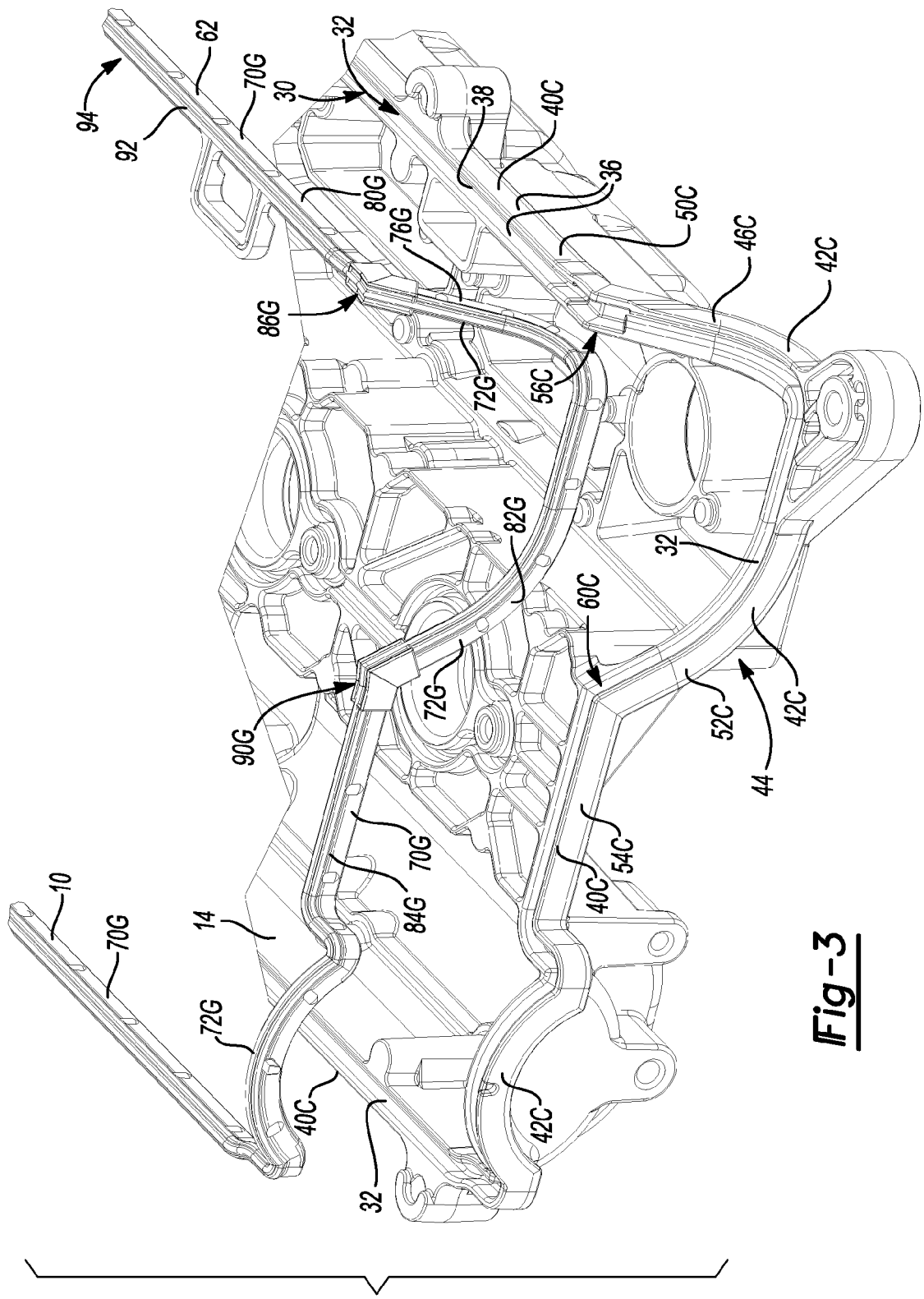
FIG. 3 is a partial exploded perspective view of the valve cover gasket and cam cover of FIG. 2.

The following description of the preferred embodiment(s) is merely exemplary in nature and is in no way intended to limit the disclosure, its application, or uses.

With initial reference to FIGS. 1 and 2, a gasket constructed in accordance to the teachings of the present disclosure is shown and designated by reference numeral 10. The gasket 10 can generally be located between a first component A and a second component B (FIG. 1). The gasket 10 according to the following description is a valve (or cam) cover gasket and is adapted to be located between the first component A or cylinder head 12 and the second component B or valve or cam cover 14. As such, while the following description is specifically directed toward a valve cover gasket 10 for forming a seal between the cylinder head 12 and the cam cover 14, the same may be applied to other applications for forming a seal between any opposing components A and B.

With specific reference to FIGS. 2 and 3, the valve cover 14 can generally include a body 20 having a plurality of cylinder head apertures 22 formed therein. Each cylinder head aperture 22 can be adapted to align and couple with a corresponding cylinder head (not shown) of an engine (not shown). The valve cover 14 can define a plurality of fastener openings 24 around an outer perimeter 26. The fastener openings 24 allow a fastener such as a bolt (not shown) to extend therethrough to secure the valve cover 14 to the cylinder head 12 and therefore securing the gasket 10 therebetween. An inboard perimeter 30 of the valve cover 14 can define a channel 32 therearound (FIG. 3). The channel 32 can generally define a pair of opposing walls 36 and a terminal wall 38 extending between the opposing walls 36 (FIG. 3). The channel 32 can be adapted to positively receive and locate the gasket 10 in an installed position (FIG. 2).

Many surfaces of the gasket 10 and the cam cover 14 have been identified with like terminology. For clarity, a suffix "G" has been used to identify certain features of the gasket 10 and the suffix "C" has been used to identify certain features of the cam cover 14. The cam cover 14 can generally define various generally linear or planar portions generally referred to at reference numerals 40C. In addition, the cam cover 14 can also define several non-linear or arcuate portions generally referred to at reference numerals 42C. One area of interest, referred to as an arch region is identified at reference numeral 44. The arch region 44 can generally include a first sloping portion 46C that slopes away from a first planar portion 50C and a second sloping portion 52C that slopes away from a second planar portion 54C. A first transition portion 56C can be defined between the first planar portion 50C and the first sloping portion 46C. A second transition portion 60C can be defined between the second planar portion 54C and the second sloping portion 52C.

With continued reference to FIGS. 2 and 3, the gasket 10 will be described in greater detail. In general, the gasket 10 can define a body 62 adapted to form a seal in an engagement region between the cylinder head 12 and the cam cover 14. In one example, the gasket 10 can be made entirely of elastomeric material. Various materials may be used such as, but not limited to, other types of resilient rubber, metal or plastic materials. In general, the gasket 10 can define a shape generally consistent with the channel 32 formed around the inboard perimeter 30 of the cam cover 14. As a result, the gasket 10 can, at least partially, cooperatively nest in the channel 32 in an installed position. In this way, the gasket 10 can define several complementary linear or planar portions 70G and non-linear or arcuate portions 72G. A first sloping portion 76G slopes away from a first planar portion 80G and a second sloping portion 82G slopes away from a second planar portion 84G. A first transition portion 86G can be defined on the gasket 10 between the first planar portion 80G and the first sloping portion 76G. A second transition portion 90G can be defined on the gasket 10 between the second planar portion 84G and the second sloping portion 82G.

The gasket 10 can generally include a first continuous bead 92 extending around a lower surface 94 for mating with the opposing surface of the cylinder head 12. In addition, a second continuous bead 98 (FIG. 6) can extend around an upper surface 96 for mating with the opposing surface of the cam cover 14, i.e., the terminal wall 38 of the channel 32. The first and second continuous beads 92 and 96 can be generally arcuate in cross-section and integrally formed with the remainder of the gasket 10. The first and second continuous beads 92 and 98 can be adapted to cooperate with the adjacent surfaces of the engine block 12 and cam cover 14 to inhibit fluid flow therebetween.

Turning now to FIGS. 4-6, the first transition portion 86G of the gasket 10 will be described in greater detail. It is appreciated that the second transition portion 90G can be similarly constructed. The first transition portion 86G generally defines an upper sealing plane 100 (FIG. 4) for mating with an opposing surface (terminal wall 38) of the cover 14 and a lower sealing plane 102 for mating with the opposing surface of the cylinder head 12. A ramped portion 104 can be defined at the first transition portion 86G. The ramped portion 104 can define a ramped surface 106 that defines an angle 110 relative to the lower sealing plane 102 and in a direction away from the upper sealing plane 100. In one example, the angle 110 can define a range between 0 degrees and 45 degrees. Those skilled in the art will recognize that other angles may be used. As can be appreciated, the ramped portion 104 can provide an increase in material at the lower sealing plane in an installed position and therefore an enhanced sealing force thereat.

The first transition portion 86G can be a stepped segment having outer (lateral) walls 118 (FIG. 5) that generally define a width 120 in a lateral direction across the engagement region that is greater than a width 122 and 124 defined in areas of the gasket 10 adjacent to the first transition portion 86G. In one example, the widths 122 and 124 can be equivalent. A pair of outboard sealing beads 130 can be formed at the first transition portion 86G on the lower surface 94 of the gasket 10. The pair of outboard sealing beads 130 can each define an arcuate cross-section although other shapes can be used. The pair of outboard sealing beads 130 can define an offset 132 measured between respective apexes that is greater than the width 122 and 124 defined in the gasket 10 adjacent to the first transition portion 86G. Connecting beads 134 can be formed on the first transition portion 86G in a direction generally transverse to the outboard sealing beads 130 and extend to the first continuous bead 92.

Figure 7:
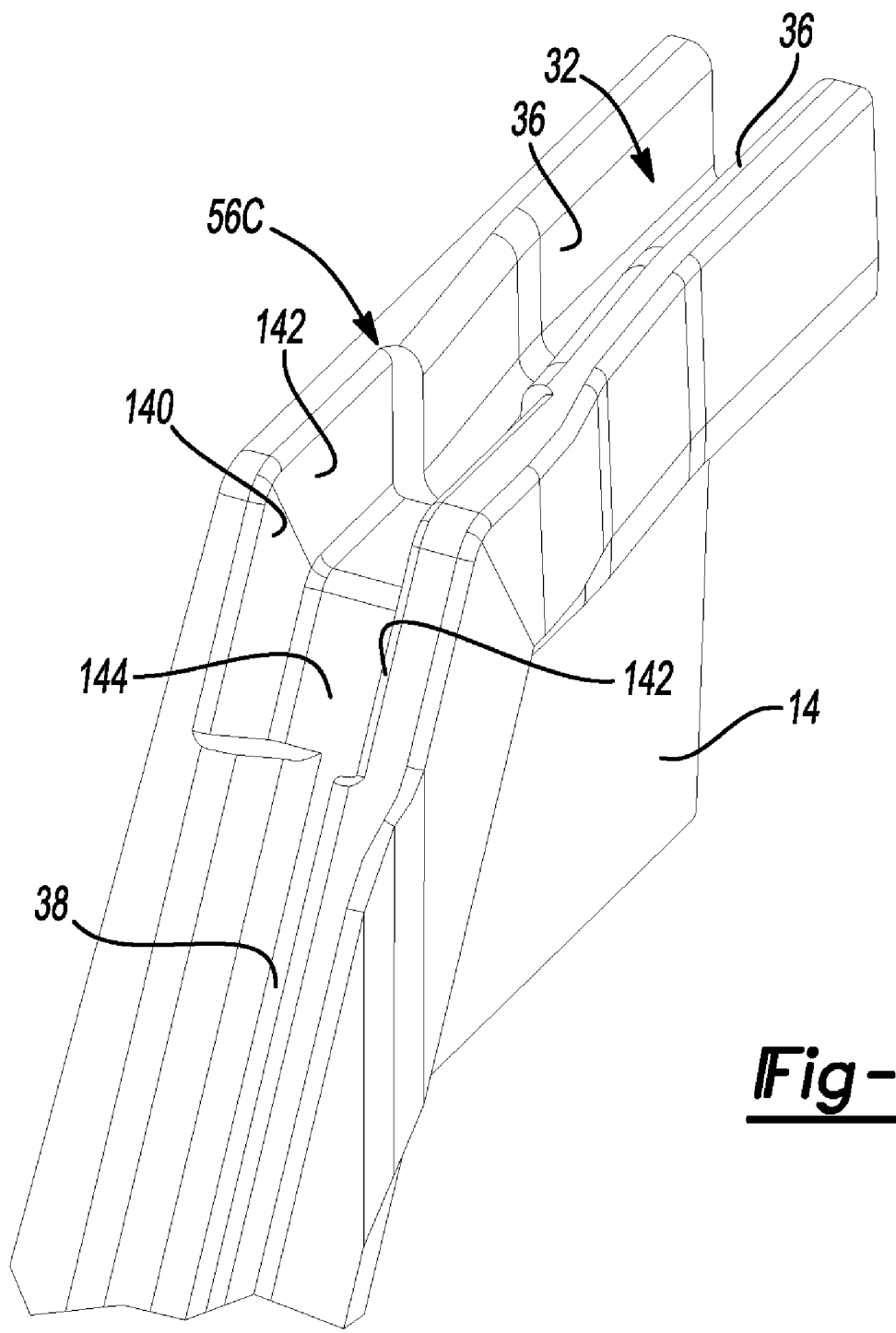
FIG. 7 is a perspective view of a pocket formed in the valve cover gasket of FIG. 5.

Turning now to FIG. 7, the first transition portion 56C of the cam cover 14 will be described in greater detail. Again, it is appreciated that the second transition portion 60C of the cam cover 14 can be similarly constructed. The first transition portion 56C can define a stepped-out portion 140 for accommodating and therefore positively locating the first transition portion 86G of the gasket 10. The stepped-out portion 140 can define opposing pocket walls 142 and a terminal pocket wall 144. Of note, the opposing pocket walls 142 can define a greater offset than the first and second walls 36 of the channel 32. The terminal pocket wall 144 can be generally coplanar with the terminal wall 38 of the channel 32.

In an installed position, the first and second transition portions 86G and 90G of the gasket 10 cooperate with the first and second transition portions 56C and 60C of the cam cover 14 to provide enhanced sealing characteristics. The collective beads (first, second, and outboard beads 92, 98, and 130, respectively), the ramped portion 104 of the gasket 10 at the transition portions 86G and 90G provide sufficient sealing characteristics to forgo application of supplementary flowable sealants. It is appreciated that while only two transition portions have been described in association with the gasket 10 and cam cover 14, it is appreciated that other transition portions may be provided for other applications. In this way, the present teachings may be similarly employed to any region of a gasket that requires a transition between a first plane to an area outside of that plane.

While the disclosure has been described in the specification and illustrated in the drawings with reference to various embodiments, it will be understood by those skilled in the art that various changes may be made and equivalents may be substituted for elements thereof without departing from the scope of the disclosure as defined in the claims.

Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the disclosure without departing from the essential scope thereof. Therefore, it is intended that the disclosure not be limited to the particular embodiment illustrated by the drawings and described in the specification as the best mode presently contemplated for carrying out this disclosure, but that the disclosure will include any embodiments falling within the foregoing description and the appended claims.

What is claimed is:

1. A gasket comprising:
   a body adapted to form a seal in an engagement region between two members;
   a first elongated sealing portion having first upper and lower surfaces connected by first inner and outer sidewall surfaces formed in a first portion of said body and having a first longitudinal axis disposed in a first plane that is parallel to said first upper and lower surfaces;

a second elongated sealing portion having second upper and lower surfaces connected by second inner and outer sidewall surfaces formed in a second portion of said body and having a second longitudinal axis disposed in a second plane that is parallel to said second upper and lower surfaces and angled at an oblique angle relative to said first plane and occupying a space on a distinct plane from said first sealing portion; and a first transition portion formed at an intersection of said body between said first and second sealing portions;

wherein said first transition portion includes inner and outer lateral sidewalls that are parallel to each other and both offset laterally outwardly from said first and second inner and outer sidewall surfaces of said first and second elongated sealing portions of said body, such that said first transition portion defines a first width between said inner and outer lateral sidewalls that is greater than a second width between said inner and outer lateral sidewalls in said first and second elongated sealing portions adjacent to said first transition portion.

2. The gasket of claim 1 wherein said first transition portion defines at least one sealing bead formed in said engagement region.

3. The gasket of claim 2 wherein said at least one sealing bead includes a continuous sealing bead formed in said first sealing portion, said second sealing portion and said first transition portion.

4. The gasket of claim 2 wherein said at least one sealing bead includes a pair of sealing beads formed on said first transition portion defining an offset that is greater than said second width.

5. The gasket of claim 4 wherein said first transition portion further comprises at least one connecting bead that extends from each sealing bead of said pair of sealing beads, said at least one connecting bead extending transverse to each respective sealing bead of said pair of sealing beads and intersecting a continuous sealing bead that extends through said first sealing portion, said transition portion and said second sealing portion, said continuous sealing bead extending along a linear path through said transition portion relative to said first and second sealing portions.

6. The gasket of claim 1 wherein said first sealing portion is further defined by an upper sealing plane and a lower sealing plane, wherein said first transition portion defines a linear ramped surface extending at an angle from said lower sealing plane in a direction away from said upper sealing plane.

7. The gasket of claim 1, further comprising a second transition portion formed at an end of said second sealing portion that defines a third width in said engagement region that is greater than said second width.

8. The gasket of claim 1 wherein said first transition portion is adapted to nest in a complementary pocket formed in a first mating member, said first transition portion operable to positively locate the gasket relative to the first mating member.

9. The gasket of claim 1 wherein said body is formed entirely of elastomeric material.

10. The gasket of claim 1 wherein said first transition portion has two connecting beads that extend transverse to said respective outer lateral walls and intersect a continuous sealing bead that is continuously formed in said first sealing portion, said second sealing portion and said first transition portion, said continuous sealing bead formed inboard relative to said two connecting beads and extending along a straight path through said transition portion relative to said first and second sealing portions.

11. A gasket comprising:
a body adapted to form a seal in an engagement region between two members;
a first elongated sealing portion having first upper and lower surfaces connected by first inner and outer sidewall surfaces formed in said body and having a first longitudinal axis disposed in a first plane that is parallel to said upper and lower surfaces, said first upper and lower surfaces disposed along a first and a second sealing plane, respectively;
a second elongated sealing portion having second upper and lower surfaces connected by second inner and outer sidewall surfaces formed in said body and having a second longitudinal axis disposed in a second plane that is parallel to said second upper and lower surfaces and that extends at an oblique angle relative to said first longitudinal axis; and
a first transition portion formed between said first and second portions;
wherein said first transition portion has outermost lateral walls that are generally transverse to said first and second sealing planes and that define a first width in said engagement region that is greater than a second width defined by both of said first inner and outer sidewall surfaces of said first sealing portion and said second inner and outer sidewall surfaces of said second sealing portion, said transition portion having a linear ramped surface continuously formed with said first sealing portion, and transitioning at an angle from said first sealing plane in a direction away from said second sealing plane, wherein said outermost lateral walls of said first transition portion are laterally offset outwardly relative to both of said first inner and outer sidewall surfaces of said first sealing portion and said second inner and outer sidewall surfaces of said second sealing portion.

12. The gasket of claim 11 wherein said first transition portion defines at least one sealing bead formed in said engagement region.

13. The gasket of claim 12 wherein said at least one sealing bead includes a continuous sealing bead formed in said first sealing portion, said second sealing portion and said first transition portion.

14. The gasket of claim 12 wherein said at least one sealing bead includes a pair of sealing beads formed on said transition portion defining an offset that is greater than said second width.

15. The gasket of claim 11, further comprising a second transition portion formed at an end of said second sealing portions that defines a third width in said engagement region that is greater than said second width.

16. The gasket of claim 11 wherein said first transition portion is adapted to nest in a complementary pocket formed in a first seal member, said first transition portion operable to positively locate the gasket relative to the first seal member.

17. The gasket of claim 11 wherein said body is formed entirely of elastomeric material.

18. A gasket comprising:
a body adapted to form a seal in an engagement region between two members;
a first elongated sealing portion having first upper and lower surfaces connected by first inner and outer sidewall surfaces formed in said body and defining a first width between said first inner and outer sidewall surfaces in said engagement region, said upper and lower surfaces having a height defined between a first and a second sealing plane, said first elongated sealing portion having a first longitudinal axis disposed in a first plane that is parallel to said first upper and lower surfaces;

a second elongated sealing portion having second upper and lower surfaces connected by second inner and outer sidewall surfaces formed in said body and defining a second width between said second inner and outer sidewall surfaces in said engagement region and having a second longitudinal axis disposed in a second plane that is parallel to said second upper and lower surfaces and that extends at an oblique angle relative to said first longitudinal axis of said first sealing portion; and a transition portion formed between said first and second sealing portions and defining a stepped segment having generally parallel outer walls, each wall being laterally offset outwardly from said first and second inner and outer sidewall surfaces of said first and second sealing portions, respectively, and defining a third width that is greater than said first and second widths, said transition portion having a linear ramped surface continuously formed with and directly adjacent to said first sealing portion, said ramped surface transitioning at an acute angle from said first sealing plane in a direction away from said second sealing plane.

19. The gasket of claim 18 wherein said transition portion defines at least one sealing bead formed in said engagement region including a continuous sealing bead extending from said first and second sealing portion.

20. The gasket of claim 19 wherein said at least one sealing bead includes a pair of sealing beads formed on said transition portion defining an offset that is greater than said second width.

* * * * *